United States Patent [19]

Glynn et al.

[11] Patent Number: 4,647,006
[45] Date of Patent: Mar. 3, 1987

[54] ROTARY ELECTRICALLY ACTUATED DEVICE

[75] Inventors: Thomas A. Glynn; Laurence E. Jones, both of Rockford, Ill.

[73] Assignee: Barber-Colman Company, Loves Park, Ill.

[21] Appl. No.: 729,917

[22] Filed: May 3, 1985

[51] Int. Cl.$^4$ .................. F16K 25/00; F16K 31/02
[52] U.S. Cl. .................................. 251/86; 251/87; 251/129.11; 251/129.2; 403/57; 403/74
[58] Field of Search .............. 251/85, 86, 87, 88, 251/129.11, 129.2; 403/57, 58, 74; 464/112, 120

[56] References Cited

U.S. PATENT DOCUMENTS

| 1,371,750 | 3/1921 | Fox | 403/57 |
| 2,554,311 | 5/1951 | Place | 464/120 |
| 2,687,024 | 8/1954 | George | 464/112 |
| 3,094,638 | 6/1963 | Humpal et al. | 464/112 |
| 3,232,076 | 2/1966 | Sundt | 464/112 |
| 4,339,737 | 7/1982 | Meyers et al. | 251/129.11 |
| 4,437,488 | 3/1984 | Taggart et al. | 251/86 |
| 4,498,888 | 2/1985 | Pastor | 464/112 |

FOREIGN PATENT DOCUMENTS 3323112 2/1984 Fed. Rep. of Germany ........ 403/57

Primary Examiner—George L. Walton
Attorney, Agent, or Firm—McDougall, Hersh & Scott

[57] ABSTRACT

A rotor is provided for use in combination with a valve and sleeve to function as a valve attached to an actuator. The rotor is comprised of a rotor body containing the drive section with the necessary elements to turn the rotor within the sleeve, and a rotor stem with ports to coact with complementary ports in the sleeve to form variable orifices to control fluid flow, and a flexible means for connecting the rotor stem to the rotor body.

10 Claims, 5 Drawing Figures

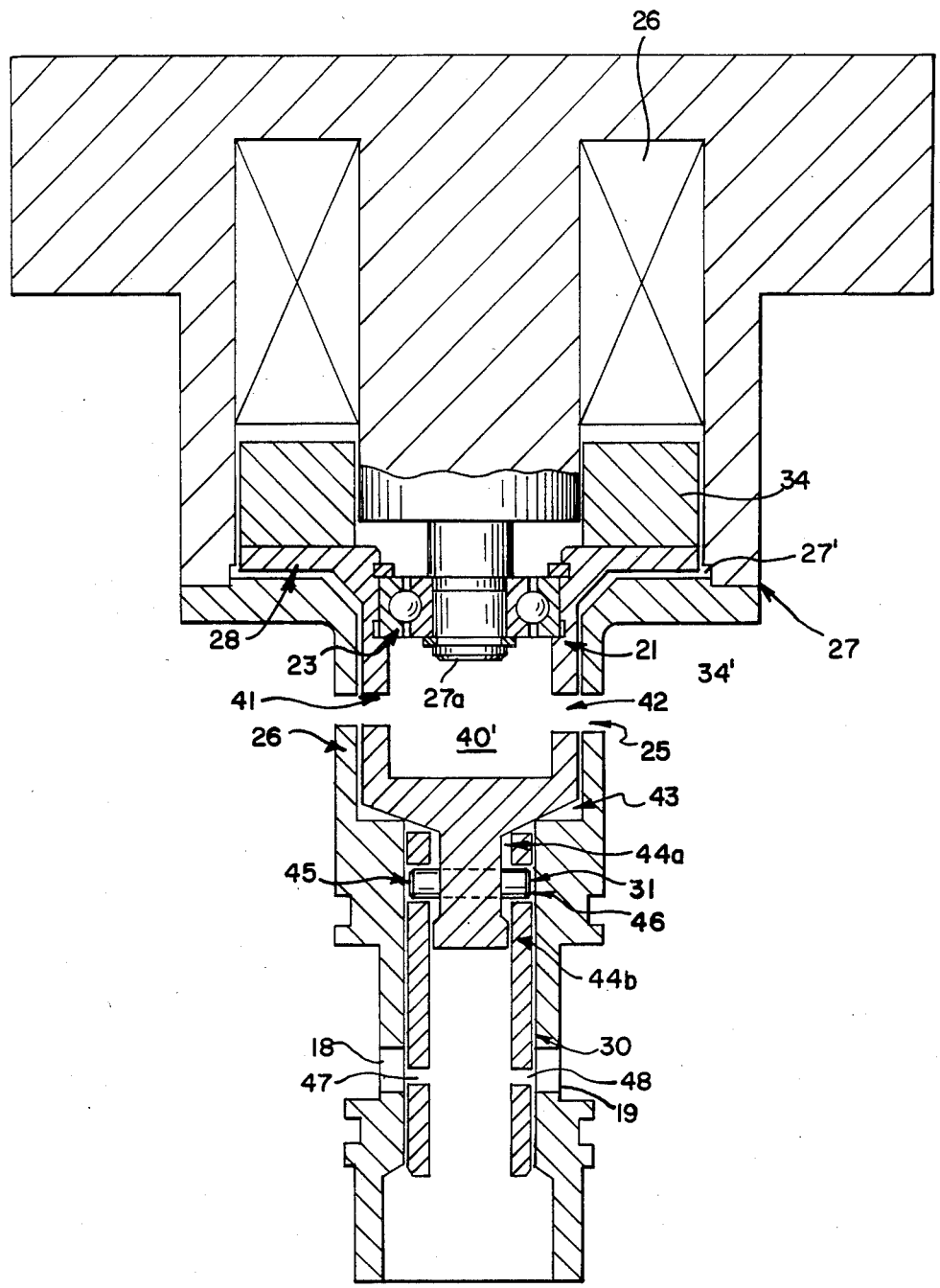

ROTARY ELECTRICALLY ACTUATED DEVICE

BACKGROUND OF THE INVENTION

The present invention relates generally to the rotor element of fluid control valves or a rotor used with an actuator. In particular, it relates to the rotor element of electrically actuated valves of the type utilized in internal combustion engines as governors to throttle the flow of fuel so as to moderate fuel pressure.

In internal combustion engines, and in manufacturing such as chemical processing, it is often necessary to control fluids flowing through lines of 0.98 to 0.787 cm in diameter. The fluids traversing these lines flow at a relatively fast rate. Due to the nature of the end process of the fluid, it is sometimes necessary to change the fluid flow rate, often from full on to full off, at rapid rates, over a sustained period of time.

Valves have been designed which are able to control fluid flow, by opening and closing their orifices, and which are able to withstand the wear of vigorous use. One such valve was disclosed in U.S. Pat. No. 4,339,737 to Meyers and Glynn. This valve comprises a rotor having a magnetically actuated rotor body housed in a stator with a coil means, and a hollow rotor stem housed in a valve sleeve. The rotor body-rotor stem is a one piece unit. The rotor stem and the valve sleeve each have a pair of symmetrical ports, which when aligned allow unrestricted fluid flow. The valve is inserted into the body of a fuel pump so the valve sleeve and rotor stem are located in the cavity of the pump. Within the cavity the fuel is under pressure so that when the ports on the rotor stem and valve sleeve are aligned fuel is forced through the rotor stem and out the valve sleeve through lines connected thereto. Energizing the stator coil attracts the magnetic poles on the rotor, causing it to turn. The movement of the rotor causes the orifice formed by the two sets of ports to change size, thus controlling the flow rate of fluid flowing through the valve. Through the use of magnets, guides, and springs, the rotor turns at a constant rate, turns only through a defined arc, and returns to its original position when the stator coil is deenergized. An additional feature of this device is a rotor stem extending below the valve ports. This rotor stem, resting in the valve sleeve, serves to stabilize the rotor as it turns.

One disadvantage of the valves of this type is that they are affected by stress from liquid in the pump cavity. The liquid in the pump cavity is under changing pressure thus causing the stress. Stress may also be caused by mechanical variations due to machining tolerances or by misalignment due to poor installation practices. These stresses subject the valve sleeve with rotor stem therein to lateral forces, causing the valve sleeve to bend. The bending of the valve sleeve may cause the rotor stem to bend, forcing it out of alignment. Such bending may also serve to reduce the lifespan of the valve.

Thus it is an object of this invention to provide a rotor of such design so as to flex within the valve sleeve so that the complementary parts will stay aligned and the efficiency of the valve will be maintained. A further advantage of this design is that wear on the rotor will be reduced increasing the useful life of the valve.

In systems known to the applicant, the manufacture of such valves is difficult. This is in part because the various valve elements are of relatively small size; stators are 1.969–3.937 cm high, and at their smallest, may be 0.787–1.575 cm across. The rotor stem required to fit inside the sleeve is, of course, smaller; it may be 1.575–2.756 cm high and at its smallest 0.098–0.591 cm in diameter. Because the various valve parts are required to be precisely aligned, the parts must be installed precisely. As a result, the cost of manufacturing these valves is relatively high.

Hence, it is an additional object of this invention to provide a valve rotor of such design that it can be inserted into the valve sleeve without precision alignment and will function properly.

BRIEF DESCRIPTION OF THE INVENTION

The foregoing and other objects of the invention are achieved by providing the rotor with a stem attached to the rotor body in a flexible manner allowing it to be disposed properly in the stator sleeve while the rotor body properly aligns with that sleeve. The flexible coupling allows the rotor body to stay aligned regardless of any bending by the sleeve or any misalignments caused by installation that would otherwise cause the stem to stick.

BRIEF DESCRIPTION OF THE DRAWINGS

FIG. 2 is a sectional view of the rotor in FIG. 1 taken along line 2—2, the rotor mounted in a stator;

DETAILED DESCRIPTION

The embodiment of the invention herein disclosed can be analyzed as having three interacting aspects. The first is the rotor body containing the drive section containing the essential electrical and mechanical elements that cause the rotor to turn, control the arc of the turn, and cause it to reset. The second aspect is the rotor stem stabilizing the rotor in the valve sleeve, and having the ports that in conjunction with the valve sleeve form the valve orifices. The third aspect is a flexible coupling between the rotor body and rotor stem that insures the rotor will properly align with the sleeve.

Figure 1:
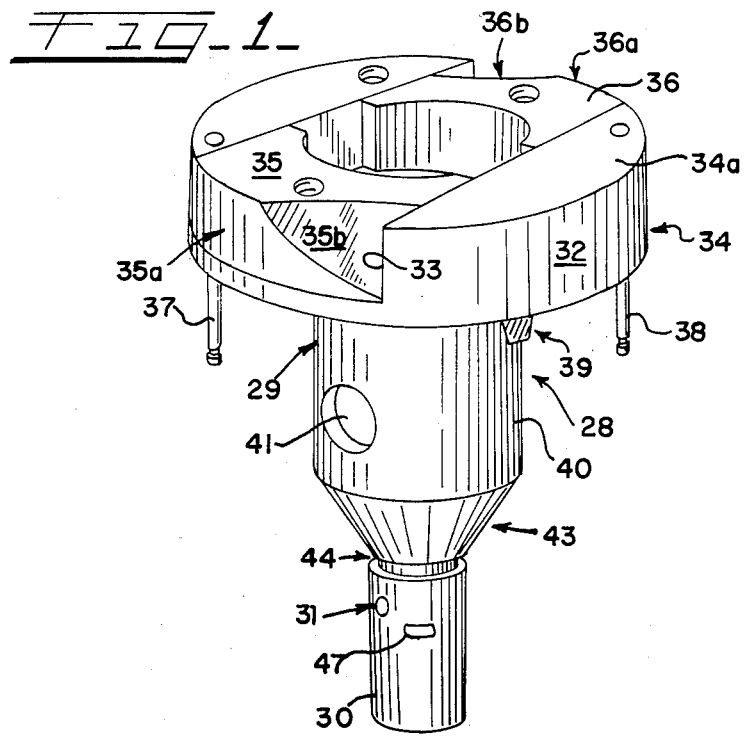
FIG. 1 is a perspective top view of one embodiment of the rotor.

Referring first to FIG. 1, the first embodiment of this invention is illustrated. Portions of all three aspects of the invention are shown in this illustration as assembled. Thus, a rotor 28 is composed of a rotor body 29, coupled to a rotor stem 30 by a connecting pin 31.

FIG. 2 illustrates how the rotor 28 is mounted so that the rotor stem 30 and bottom portion of the rotor body 29 are located inside a valve sleeve 20 with the top portion of the rotor body located in stator 27 to form a valve. The rotor body 29 comprises a drive section 34 having a cylindrically shaped outer surface 32 rotating in response to the energization of a coil 26 mounted in stator 27. In this version of the invention, drive section 34 has a diametrical channel 33 formed along its top surface 34a. Magnetic pole pieces 35, 36 are mounted on opposite ends of diametrical channel 33. The peripheral faces 35a, 36a of pole pieces 35, 36 are curved so as to be flush with the outer surface 32 of drive section 34. The end faces of the pole pieces are provided with inwardly flared surfaces 35b, 36b.

Extending downward from the underside of drive section 34 are a pair of pegs 37, 38 mounted opposite each other. The pegs 37, 38 are connected to the sleeve 20 by springs (not illustrated) so as to provide a biasing force to return the rotor to its at rest position when coil 26 is deenergized. Also extending downward from the underside of drive section 34 is peg 39 engaging in a curved slot (not illustrated) in the sleeve and serving to limit the turn of rotor 28 when coil 26 is energized or deenergized.

Extending downward from the underside of drive section 34 is tubular port section 40 coextensive with drive section 34. The port section 40 is provided with a pair of diametrically opposed radial ports 41, 42 which, in conjunction with corresponding stator ports 24, 25, provide an opening allowing fluid to flow into a space 40' between the rotor and the valve sleeve and stator. Fluid entering the space 40' passes upwardly under pressure, through a space 34' between the bottom of the drive section 34 and the bottom of the stator 27. It then travels upwardly through a space 27' between the stator wall and the drive section. By virtue of this arrangement the pressure on opposite sides of the drive section 34 including the bearing 23 is equalized to relieve pressure on the bearing. The fluid also functions as cooling and lubricating agents for these rotating parts.

In this embodiment of this invention a connector section 44 extends downward from the center of a conical bottom portion 43 of the rotor body 29. The connector section 44 is cylindrical, with its bottom portion 44b having a slightly larger diameter than its main portion 44a. A cylindrical connecting pin 31 is friction fitted laterally through the center axis of connecting section main portion 44a and has a length slightly less than the outside diameter of rotor stem 30.

The rotor stem 30 is a cylindrical tube section with an inside diameter greater than connecting section bottom portion 44b, and an outside diameter less than the diameter of port section 40. The rotor stem extends downward from the connecting section 44 and is connected thereto by the connecting pin 31 which extends through symmetrical mounting holes 45, 46 located in the top of the rotor stem.

The rotor stem 30 has a pair of diametrically opposed ports 47, 48 near its lower end of rotor stem 30. These ports in combination with ports 18, 19 on the valve sleeve 20 form variable orifices to control fluid flow.

The rotor 28 mounted in the stator 27 rotates about the bearing 23 mounted on a stator center post 27a. Ledge 21, cut along the top of the inside wall of port section 40 holds the bearing ring 23 within rotor body 29.

The rotor stem 30, as may be seen, is disposed in the valve sleeve and is attached to rotor body 29 by connecting pin 31. By virtue of this connection, the rotor stem 30 may pivot in one plane about the pin with respect to rotor body 29. This flexibility allows the rotor stem to move or pivot with the valve sleeve when that valve sleeve is flexed by installation or pressure in the pump cavity. Thus, binding of the rotor stem is avoided and wear is reduced. Further, ease of manufacture is enabled because dimensional variations are accomodated.

In the operation of the invention, fluid from the pump cavity enters valve sleeve 20 through the bottom opening and exits through the variable openings provided by ports 18 and 19 in the valve sleeve and ports 47 and 48 in the rotor stem 30. By virtue of the flexible coupling between the rotor stem the rest of the rotor in flexing of the valve sleeve, variations in tolerance and misalignment problems can be accommodated.

Figure 3:
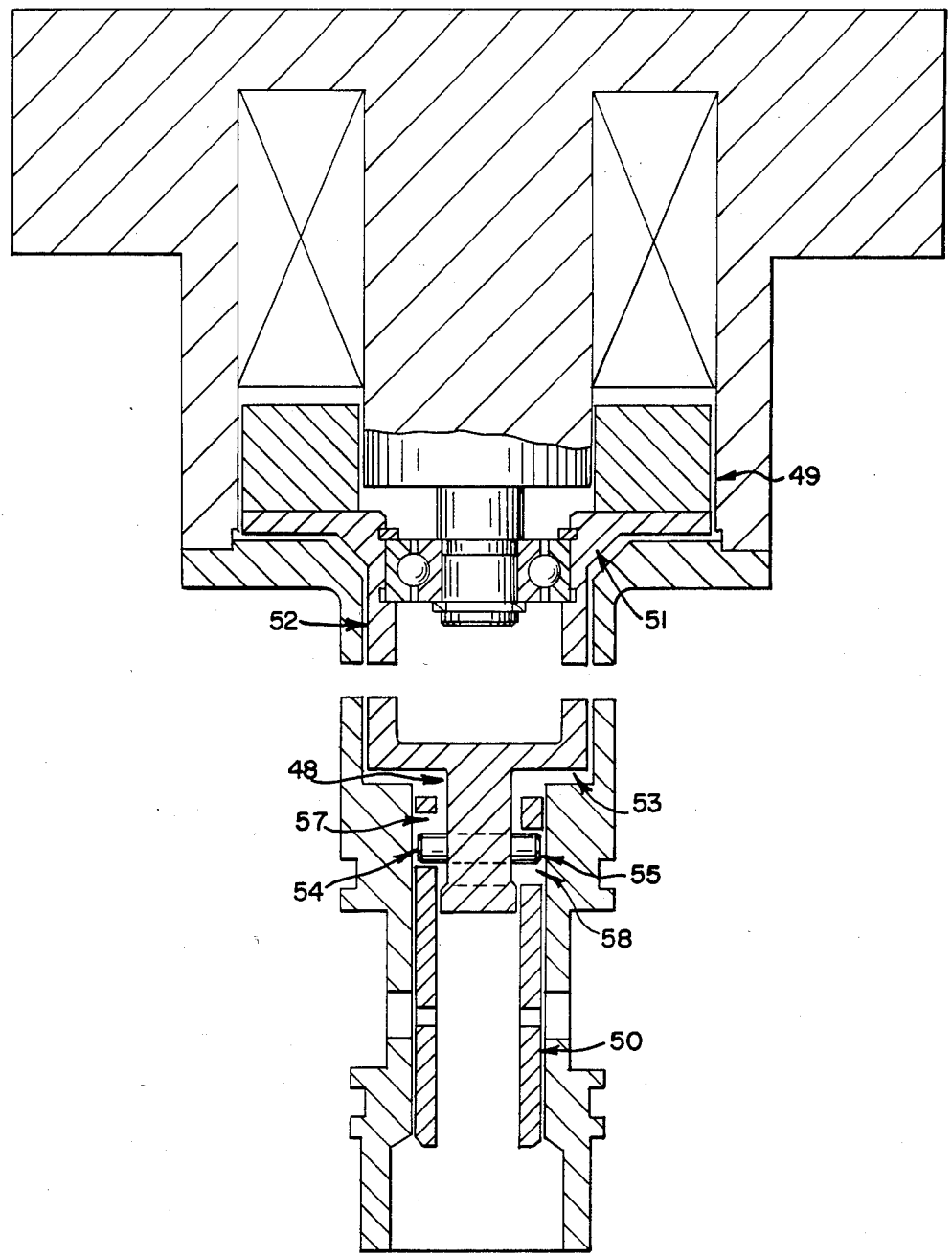
FIG. 3 is a sectional view of a second embodiment of the rotor mounted in a stator.

FIG. 3 illustrates a second embodiment of this invention. In this embodiment the rotor body 51 is essentially the same shape as rotor body 29 in the first embodiment, it comprises the same three sections: the drive section 49; port section 52; and connecting section 48. As may be seen in this embodiment the bottom portion 53 is of flat circular design concentric with port section 52 and connected to the rotor stem 50 by a universal joint 54. The universal joint 54 comprises a connecting pin 55, and diametrically opposed mounting holes 57, 58 formed in the rotor stem 50. The connecting pin 55 is mounted in section 48 in the same manner, and is of the same length as described in connection with the first embodiment. The mounting holes 57, 58 are of oval shape and extend vertically some distance greater than the diameter of the pin 55. The holes are offset from each other in the rotor stem 50 in such a manner that the rotor stem 50 may pivot about the rotor body limited by its contact with both the bottom of mounting hole 57 and the top of mounting hole 58.

This embodiment allows the rotor stem to pivot freely about the rotor body in two planes so that regardless of the direction the valve sleeve is bent the rotor stem will move correspondingly.

Figure 5:
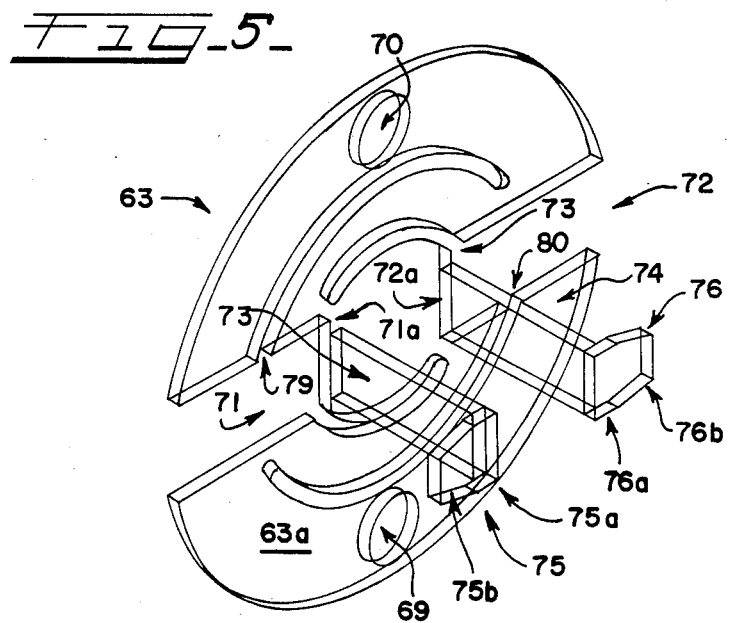
FIG. 5 is a perspective side view of the disc spring element of the third embodiment of the rotor.
Figure 4:
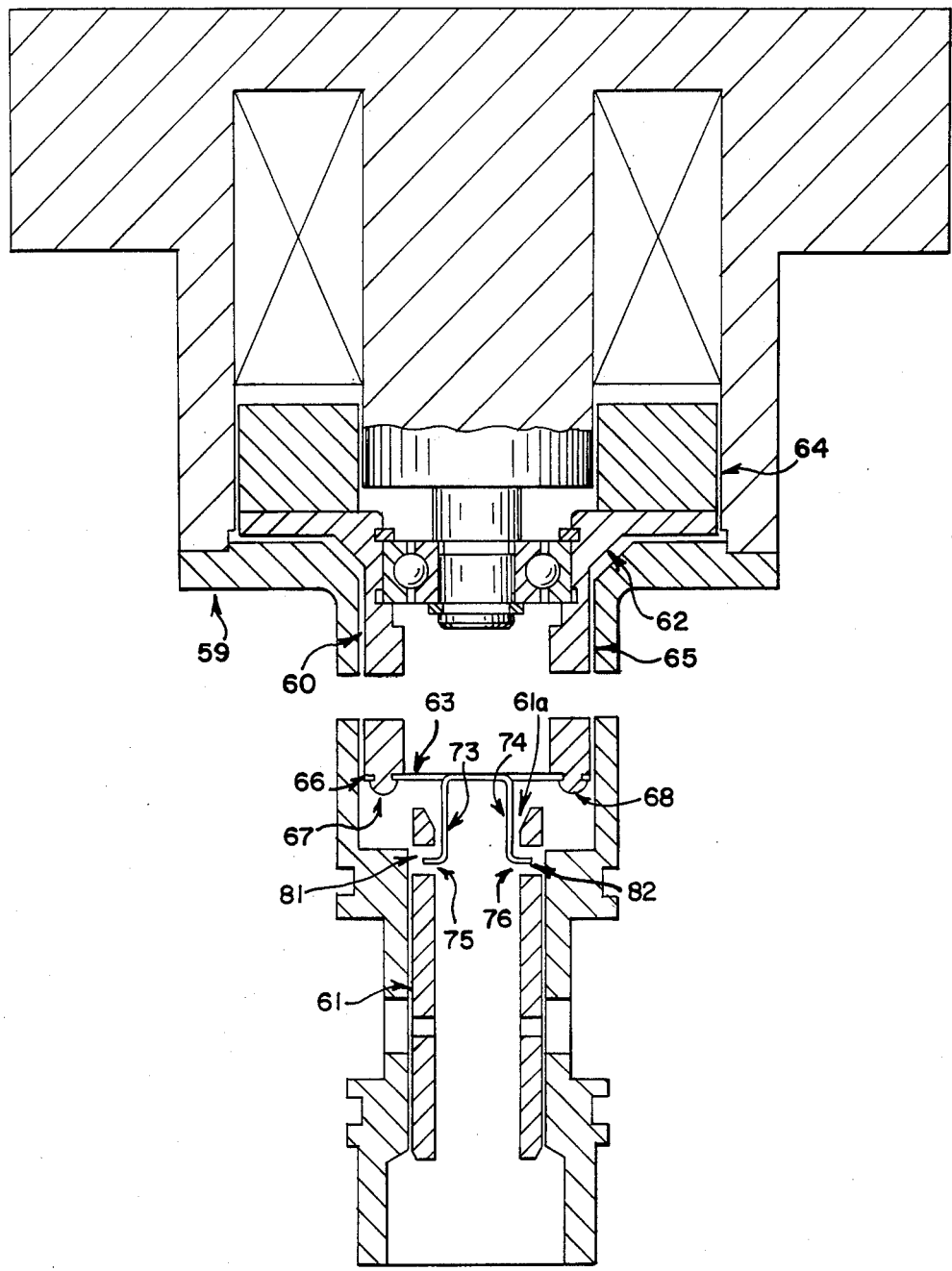
FIG. 4 is a sectional view of a third embodiment of the rotor mounted in a stator.

FIGS. 4 and 5 illustrate a third embodiment of this invention. In this embodiment rotor 60 comprises rotor stem 61 mounted to rotor body 62 by means of a connecting member or universal joint 63.

In this embodiment a rotor body 62 is composed of a drive section 64 and port section 65 having the same design as disclosed in the first two embodiments. The bottom portion 66 of the port section 65 is provided with circular opening and has two diametrically opposed downward-extended semi-spherical mounting members 67, 68.

FIG. 5 illustrates the disc spring connecting member or universal joint 63 in detail. The member may be formed as a one-piece element by stamping relatively thin metal material so that it is relatively flexible. It includes a circular base portion 63a coextensive with the bottom portion 66 of port section 65. Mounting holes 69, 70 are symmetrically located near the perimeter of base portion 63a with their centers dimensioned to engage the mounting members 67, 68.

A pair of symmetric slots 71, 72 are formed in base portion 63a to a point near its center. A pair of legs 73, 74 extend from the ends of the slots 71a and 72a near the center of base portion 63a. The legs 73, 74 are provided with a pair of feet 75, 76 extending outwardly therefrom and dimensioned to engage in openings in the rotor stem as described hereinafter.

The base portion 63a has a pair of symmetric inner grooves 77, 78 and a pair of symmetric outer grooves 79, 80. Both pairs of said grooves are arcuate and concentric with the center of base portion 63a. The inner grooves 77, 78 form an arc running from a point near a corner-edge of one of slots 71, 72 to a point near the closest corner-edge of the opposite slot. The outer grooves 79, 80 form an arc running from the center-edge of one of slots 71, 72 to a point near the closest corner-edge of the opposite slot. Grooves 77, 78 and 79, 80 are opposite of each other so that only one slot starts from each edge of slots 71, 72. By virtue of this arrangement the legs are capable of pivoting movement in a first plane essentially perpendicular to a plane containing the base portion 63a by flexing the portions bounded by the grooves 79 and 78 and 77 and 80.

The rotor stem 61 has the same general cylindrical tube shape described in the previous embodiments of this invention. It has an inside diameter sufficient to accomodate the legs 69, 70 with only minimal compression of said legs, and an outside diameter less than the inside diameter of port section 65. The top inside surface of rotor stem 61 is counter-bored to form flared surface 61a of slightly larger inside diameter than in the remainder of said rotor stem. Below the flared surface 61a are a pair of mounting openings 81, 82. The mounting openings 81, 82 are symmetrically located extending through rotor stem 61 and are of an approximate oval shape to accomodate feet 75, 76.

The disc spring 61 is mounted on bottom ring 65 of port portion 64 with the legs 73, 74 extending downward. It is attached by aligning base portion 63a so that mounting members 67, 68 extend through and engage the mounting holes 69,70. The mounting members may then be deformed securing said disc spring to the portion 64.

The rotor stem 61 is attached to disc spring 63 by compressing the legs 73, 74 together. This action moves the feet 75, 76 together so that the rotor stem 61 may be passed over the feet. The compression on legs 73, 74 is then released, the feet 75, 76 engaging in mounting openings 81, 82 securing the rotor stem 61 to the disc spring 63 and the port section 65.

After the rotor stem 61 is mounted together with disc spring 63 and rotor body 62, the rotor 60 can be inserted into the stator and valve sleeve and the combination used as a valve or actuated as described. This action allows the rotor stem to turn in the valve sleeve regardless of the direction the valve is bent. The connection also provides sufficient flexibility in the connection between the disc spring legs and the rotor stem that the valve sleeve will function together properly regardless of any misalignment caused during assembly of the valve. A further advantage of this embodiment is that the disc spring can be formed using relatively economical methods of fabrication.

This embodiment of the invention allows for rotor 60 to be serviced with minimal difficulty. Should it become necessary to replace either rotor body 62 or rotor stem 61 the elements may be disconnected by compressing the legs 73, 74 with a hand tool (e.g. needle nose pliers) until the feet 75, 76 release rotor stem 61. This allows for replacing the defective element without having to replace the whole rotor.

While we have shown and described embodiments of this invention in some detail, it will be understood that this description and illustration is offered merely by way of example, and that the invention is to be limited only by the appended claims.

What is claimed as new and desired to be secured by Letters Patent is:

1. In a circular rotor used in combination with a stator and a valve housing sleeve to form a valve body and valve actuator, said rotor having a rotor body located within said stator and containing drive means capable of turning said rotor and having a portion extending into said valve sleeve, and a rotor stem located in said valve sleeve, said rotor stem constituting a valve portion having communicating ports to act in conjunction with ports on said valve sleeve to form variable sized orifices to function as a valve element; the improvement comprising a flexible means located within said valve sleeve for attaching said rotor stem to said portion of said rotor body so that said rotor stem may pivot with respect to said rotor body so that said valve element will move laterally to permit said valve element to turn within said valve sleeve when said valve sleeve is subject to lateral bending in response to external forces to allow said rotor body to stay aligned regardless of said bending by said valve sleeve or any misalignments caused in installation that would otherwise cause said stem to stick.

2. The device of claim 1 wherein said flexible means for attaching said rotor stem to said rotor body includes a cylindrical connecting section extending downward from said rotor body into said valve sleeve, concentric with it and having a diameter less than the inside diameter of said rotor stem; a cylindrical connecting pin extending perpendicularly through the center of said connection section; mounting holes located near the top of said rotor stem of a diameter large enough to accommodate said mounting pin so that said rotor stem can be inserted over said cylindrical connecting section and secured to said connecting section by said connecting pin passing through said connecting holes and through said connecting section, whereby said rotor stem pivots in one plane around said connecting pin.

3. The invention of claim 2 wherein said connecting section is formed with a conical shaped bottom portion extending downward from and concentric with said rotor body, the connecting section extending downward from said bottom portion.

4. The invention of claim 1 wherein said flexible means for attaching said rotor stem to said rotor body comprises a universal joint whereby said rotor stem is able to pivot in two planes around the axis of said rotor body.

5. The invention of claim 4 wherein said universal joint comprises a cylindrical connecting section extending downward from said rotor body and coextensive with it, a cylindrical connecting pin of a length slightly less than the outside diameter of said rotor stem mounted perpendicularly to the axis of said connecting section; a pair of oval mounting holes with longitudinal axes parallel to said rotor stem's axis, located near the top of said rotor stem, said holes having sufficient width to accommodate the ends of said connecting pin, and offset from each other to permit said connecting pin to pivot therein.

6. The invention of claim 5 wherein said connecting section has a bottom portion of greater outside diameter than the main portion of said connecting section.

7. The invention of claim 1 wherein said disc spring comprises a base portion of flexible material secured to said rotor body, a pair of symmetrical legs extending outwardly from said base portion closest to the center of base portion; slots formed in said base portion adjacent the juncture of said legs and said base portion extending outwardly therefrom to the perimeter of said base portion; a pair of inner grooves and a pair of outer grooves formed in said base portion, said grooves arcuate and concentric with the center of said base portion, each of said grooves extending from the edge of one of said slots to a point near the edge of the opposite slot, said grooves arranged so that said inner grooves start from the edge of said slots adjacent the juncture of said leg and said base portion and said outer grooves start from the opposite edge of said slots at intermediate locations along said slot whereby said legs may be flexed about said base portion.

8. In a circular rotor used in combination with a stator and a valve housing sleeve to form a valve body and valve actuator, said rotor having a rotor body located within said stator and containing drive means capable of turning said rotor, and a rotor stem constituting a valve portion located in said valve sleeve, said rotor stem having valve communicating ports to act in conjunction with ports on said valve sleeve to form variable sized orifices to function as a valve element; the improvement comprising a flexible means located within said valve sleeve for attaching said rotor stem to said rotor body so that said rotor stem will pivot off said rotor body so that said valve element will move laterally to permit said valve element to turn within said valve sleeve when said valve sleeve is subject to lateral bending in response to external forces to allow said rotor body to stay aligned regardless of said bending by said valve sleeve or any misalignments caused by installation that would otherwise cause said stem to stick, wherein said flexible means for mounting said rotor stem to said rotor body is a disc spring comprising a base portion of flexible material secured to said rotor body, a pair of symmetrical legs extending outwardly from said base portion closest to the center of base portion; slots formed in said base portion adjacent the juncture of said legs and said base portion extending outwardly therefrom to the perimeter of said base portion; a pair of inner grooves and a pair of outer grooves formed in said base portion, said grooves arcuate and concentric with the center of said base portion, each of said grooves extending from the edge of one of said slots to a point near the edge of the opposite slot, said grooves arranged so that said inner grooves start from the edge of said slots adjacent the juncture of said leg and said base portion and said outer grooves start from the opposite edge of said slots at intermediate locations along said slot whereby said legs may be flexed about said base portion.

9. The invention according to claim 8 wherein said disc spring is secured to said rotor body by downwardly extending mounting members located on the bottom surface of said rotor body; and mounting holes located on said base portion of said disc spring to receive said mounting members.

10. The invention according to claim 9 wherein said rotor stem is mounted on said disc spring by feet extending from said legs of said disc spring; oval shaped mounting openings located in the top of said rotor stem for receiving said feet.

* * * * *